United States Patent
Carboni et al.

(10) Patent No.: US 12,466,151 B2
(45) Date of Patent: Nov. 11, 2025

(54) MAGAZINE FOR PACKS OF BLANKS, AND METHOD FOR MAKING CONTAINERS FROM BLANKS

(71) Applicant: G.D S.p.A., Bologna (IT)

(72) Inventors: Salvatore Carboni, Bologna (IT); Andrea Biondi, Bologna (IT); Antonio Vitali, Molinella (IT)

(73) Assignee: G.D S.p.A., Bologna (IT)

( * ) Notice: Subject to any disclaimer, the term of this patent is extended or adjusted under 35 U.S.C. 154(b) by 193 days.

(21) Appl. No.: 17/781,118

(22) PCT Filed: Nov. 19, 2020

(86) PCT No.: PCT/IB2020/060929
§ 371 (c)(1),
(2) Date: May 31, 2022

(87) PCT Pub. No.: WO2021/111231
PCT Pub. Date: Jun. 10, 2021

(65) Prior Publication Data
US 2022/0388267 A1 Dec. 8, 2022

(30) Foreign Application Priority Data
Dec. 2, 2019 (IT) .................. 102019000022638

(51) Int. Cl.
*B31B 50/06* (2017.01)
*B31B 50/02* (2017.01)
*B31B 50/26* (2017.01)
*B31B 100/00* (2017.01)

(52) U.S. Cl.
CPC .......... *B31B 50/062* (2017.08); *B31B 50/022* (2017.08); *B31B 50/26* (2017.08); *B31B 2100/0022* (2017.08)

(58) Field of Classification Search
CPC ..... B31B 50/062; B31B 50/022; B31B 50/26; B31B 2100/0022; B31B 50/06; B31B 50/02; B31B 50/04; B31B 50/066
(Continued)

(56) References Cited

U.S. PATENT DOCUMENTS

| | | | | |
|---|---|---|---|---|
| 4,688,681 A | * | 8/1987 | Bergeron | A47F 7/08 211/195 |
| 4,712,691 A | * | 12/1987 | Grill | B65G 1/14 211/49.1 |

(Continued)

FOREIGN PATENT DOCUMENTS

| | | |
|---|---|---|
| DE | 1122000 B | 1/1962 |
| DE | 10300583 A1 | 7/2004 |
| SU | 735496 A1 | 5/1980 |

OTHER PUBLICATIONS

International Search Report and Written Opinion dated Feb. 22, 2021 from counterpart International Patent Application No. PCT/IB2020/060929.

*Primary Examiner* — Sameh Tawfik
(74) *Attorney, Agent, or Firm* — SHUTTLEWORTH & INGERSOLL, PLC; Timothy J. Klima

(57) ABSTRACT

A magazine for packs of blanks includes a vertical channel configured for inserting and extracting packs of blanks, a succession of groups of supporting parts movable between a retracted position to allow the packs of blanks to move along the channel towards a portion under the supporting part, and an at least partly extracted position, in which the supporting part intercepts a pack of blanks moving down the channel and provides a steady support for the pack of blanks, and transmission means configured to automatically move each supporting part from the retracted position to the at least (Continued)

partly extracted position when the supporting part immediately below it intercepts a respective pack of blanks, thereby defining the steady support.

4 Claims, 4 Drawing Sheets

(58) Field of Classification Search
USPC .......................................................... 493/309
See application file for complete search history.

(56) References Cited

U.S. PATENT DOCUMENTS

| | | | | |
|---|---|---|---|---|
| 4,813,659 | A | | 3/1989 | Neri |
| 5,005,712 | A | * | 4/1991 | Niederprum ........... A47F 7/0042 53/244 |
| 5,217,121 | A | * | 6/1993 | Walker ..................... B65G 1/14 211/59.4 |
| 5,971,906 | A | * | 10/1999 | Tharpe, Jr. ......... B65D 71/0096 493/131 |
| 5,988,777 | A | * | 11/1999 | Schoeller ................. B65G 1/14 312/190 |
| 6,223,911 | B1 | * | 5/2001 | Weaver .................... B65G 1/14 211/150 |
| 10,829,318 | B2 | * | 11/2020 | Kreft ...................... A47F 7/0014 |
| 11,104,533 | B2 | * | 8/2021 | Fridolfsson ........ B65H 31/3045 |
| 11,542,099 | B2 | * | 1/2023 | Laible ...................... B65G 1/14 |
| 11,866,082 | B2 | * | 1/2024 | Carboni ................... B65G 1/14 |
| 11,982,139 | B2 | * | 5/2024 | Saunders ................ E21B 19/14 |
| 2019/0152734 | A1 | * | 5/2019 | Fridolfsson .............. B65H 1/30 |

* cited by examiner

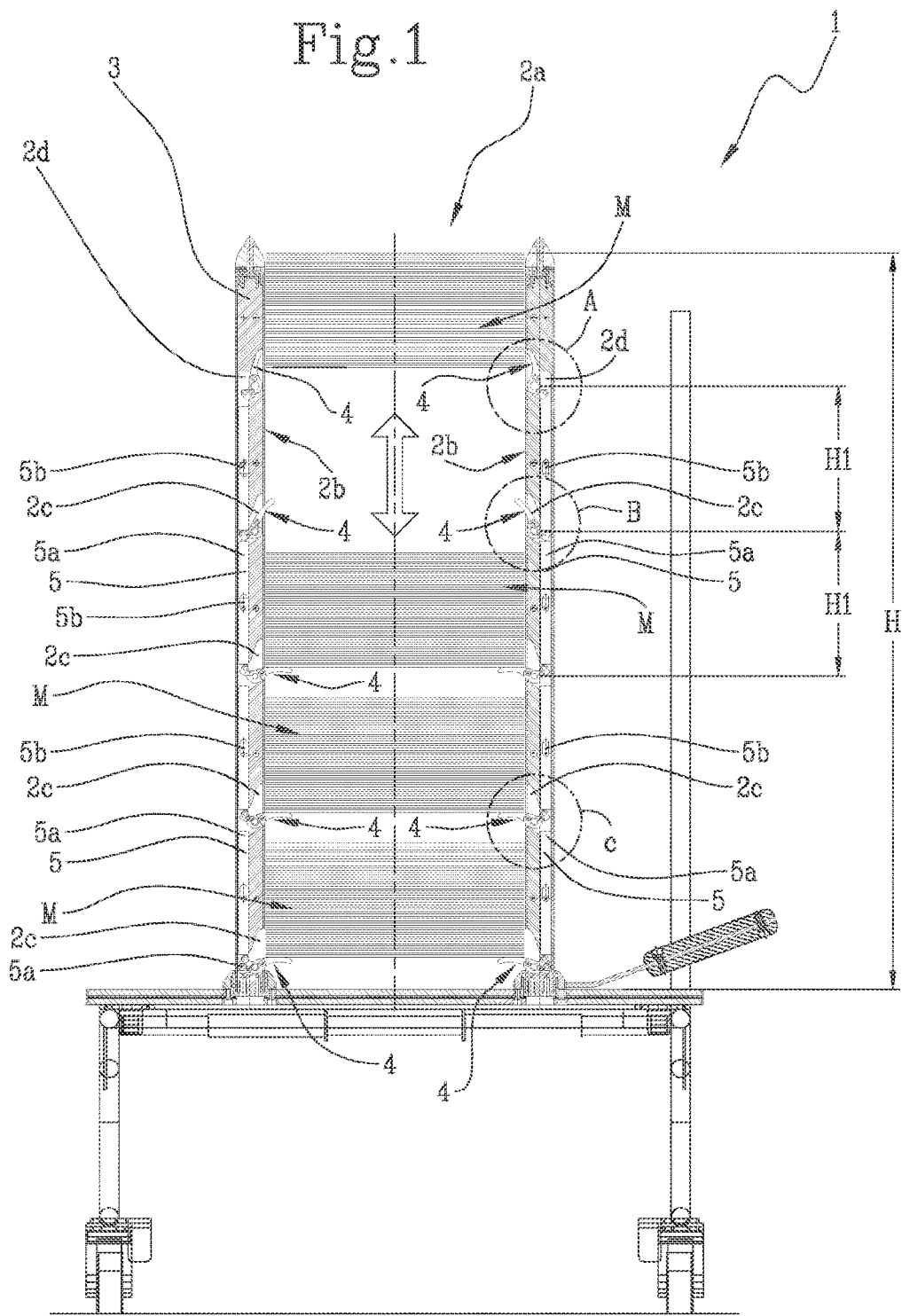

MAGAZINE FOR PACKS OF BLANKS, AND METHOD FOR MAKING CONTAINERS FROM BLANKS

This application is the National Phase of International Application PCT/IB2020/060929 filed Nov. 19, 2020 which designated the U.S.

This application claims priority to Italian Patent Application No. 102019000022638 filed Dec. 2, 2019, which application is incorporated by reference herein.

TECHNICAL FIELD

This invention relates to a magazine for packs of blanks.

By "pack of blanks" is meant a group of blanks stacked on top of one another to form a single unit. The blanks may be made of cardboard, for example, although other materials may be used, depending on what the blank is going to be used for.

BACKGROUND ART

Magazines for containing packs of blanks known up to the present time extend horizontally along a respective axis. These horizontal magazines usually have a cross section whose shape follows the profile of a single blank (or of a pack of blanks). In other words, the blanks or packs of blanks are made to slide in a channel of the magazine which extends horizontally in such a way as to define a single pile, also extending horizontally.

Disadvantageously, this type of magazine makes it difficult for the blanks or, more specifically, the packs of blanks to be withdrawn in specific numbers or types.

What is more, the difficult of withdrawing them can also lead to the blanks being damaged by an operator or automated handling means.

Disadvantageously, its configuration means that a magazine of this kind has a large footprint, making it problematic, in practice, to find the optimal location for it when designing a building/storage facility.

AIM OF THE INVENTION

The technical purpose of the invention is therefore to provide a magazine for packs of blanks which is able to overcome the drawbacks of the prior art.

The aim of this invention is to provide a magazine for packs of blanks with a reduced footprint, allowing a suitable location for it to be identified more easily when designing a building/storage facility.

Another aim of the invention is to provide a magazine for packs of blanks which allows the blanks or packs of blanks to be extracted easily.

The technical purpose indicated and the aims specified are substantially achieved by a magazine for packs of blanks comprising the technical features described in one or more of the appended claims. The dependent claims correspond to possible embodiments of the invention.

More specifically, the technical purpose indicated and the aims specified are substantially achieved by a magazine for packs of blanks comprising a vertical channel configured for inserting and extracting packs of blanks through an opening at the top of the channel.

The channel also comprises a succession of groups of supporting parts spaced, along a height of an inside wall of the channel, at predetermined distances from each other, in such a way that each group of supporting parts is located at a respective level of the channel to support the bottom of a respective pack of blanks. Each supporting part is movable between a retracted position, in which the supporting part is aligned or recessed with respect to the inside wall of the channel to allow the packs of blanks to move along the channel towards a portion under the supporting part, and an at least partly extracted position, in which the supporting part projects from the inside wall towards the inside of the channel in such a way as to intercept a pack of blanks moving down the channel and to provide a steady support for the pack of blanks.

The magazine also comprises transmission means configured to automatically move each supporting part from the retracted position to the at least partly extracted position when the supporting part immediately below it intercepts a respective pack of blanks, thereby defining the steady support.

The supporting parts can create different storage levels for different packs of blanks, even blanks of different sizes. Furthermore, the supporting parts are placed at positions such as to support the pack of blanks at a plurality of points located along the perimeter of the pack, for example in the zones most subject to bending or sagging. The number and/or position of the supporting elements of each group—that is to say, of each level—may be such as to stop the pack in such a way that it can be removed from the magazine only vertically and not, for example, from the side. This is particularly common in the case of blanks of complex shape, with undercuts.

The magazine is manageably sized and easy to use for an operator. The magazine is also configured to be used with automated means.

Advantageously, the magazine allows avoiding damage to the packs of blanks when they are inserted and when they are extracted (whether the packs are inserted/extracted by an operator or by automated means).

The magazine according the invention is especially designed for the temporary storage of blanks intended for making three-dimensional containers, especially packages for loose products for the coffee market: for example, capsules or pods. More generally speaking, the invention is applicable to the production of containers in the following sectors: food, absorbent products, ceramic ware, tobacco industry, fine quality boxes or standard boxes intended to be sold empty.

The invention is also particularly suitable for storing packs of blanks where the blanks have a complex shape. That means, in detail, that the shape of the blanks, in plan, is not simply that of a convex polygon but has one or more lobes which give the blank a structure having at least one direction of extension and at least one protrusion extending along a direction perpendicular to the predominant direction of extension. For example, the blanks may be T-shaped or cross-shaped.

In light of the above, another object of the invention is a method for making containers from blanks, in particular containers for containing loose articles such as capsules or the like, comprising the steps of preparing a succession of blanks, preferably flat, and folding the blanks about preferably pre-made fold lines on each blank so as to obtain a succession of three-dimensional containers, wherein the step of preparing the succession of blanks is accomplished by a step of withdrawing a pack of blanks from a magazine according to what is set out in the foregoing and/or according to the invention, in particular, a magazine provided with a vertical channel and configured to support a plurality of packs, wherein the packs of blanks can be accommodated in the magazine above one another and spaced apart by means of a succession of groups of supporting parts distributed, along a height of an inside wall of the channel, at predetermined distances from each other. Each group of supporting parts is thus located at a respective level of the channel to support the bottom of a respective pack of blanks and each supporting part is movable between a retracted position, in which the supporting part is aligned or recessed with respect to the inside wall of the channel to allow the packs of blanks to move along the channel towards a portion under the supporting part, and an at least partly extracted position, in which the supporting part projects from the inside wall towards the inside of the channel in such a way as to intercept a pack of blanks moving down the channel and to provide a steady support for the pack of blanks. The step of withdrawing the pack of blanks from the magazine is accomplished by a step of vertically extracting the pack of blanks from the channel, specifically through an upper opening at the top of the channel, by a manual or robotized action or using forks or other mechanical means.

More in detail, the step of vertically extracting a pack of blanks from the magazine is accomplished by lifting the pack from the respective group of supporting parts and is followed by a step of automatically moving the supporting parts immediately above it—that is to say, of the level immediately above—from the at least partly extracted position to the retracted position. Thus, the supporting parts of the upper level are retracted to allow the pack of the blanks to be extracted.

According to the invention, the method also comprises a step of placing at least one pack of blanks in the magazine, wherein the step of placing is accomplished by resting the pack on the supporting parts of a respective group of supporting parts (specifically, those at the free level above) and is followed by a step of automatically moving each supporting part of the group of supporting parts immediately above it from the retracted position to the at least partly extracted position, so as to prepare the level above that pack to receive the next pack.

BRIEF DESCRIPTION OF THE DRAWINGS

Further features of the invention and its advantages are more apparent in the non-limiting description below, with reference to a preferred embodiment of a magazine for packs of blanks.

The description is set out below with reference to the accompanying drawings which are provided solely for purposes of illustration without restricting the scope of the invention and in which:

FIG. 1 is a front view of the magazine of this invention;

DETAILED DESCRIPTION OF PREFERRED EMBODIMENTS OF THE INVENTION

With reference to the accompanying drawings, the numeral 1 denotes in its entirety a magazine for packs of blanks M which, for simplicity of description, is hereinafter called magazine 1.

By "pack of blanks M" is meant a group of blanks stacked on top of one another to form a single unit.

The magazine 1 comprises a vertical channel 2 configured for inserting and extracting packs of blanks "M" through a top opening $2a$ of the channel 2. The channel 2 extends mainly in height and its cross section has substantially the same shape as the blank (that is, of the pack of blanks M) to be stored. The top opening $2a$ thus has the same shape as the cross section of the channel 2.

Figure 2:
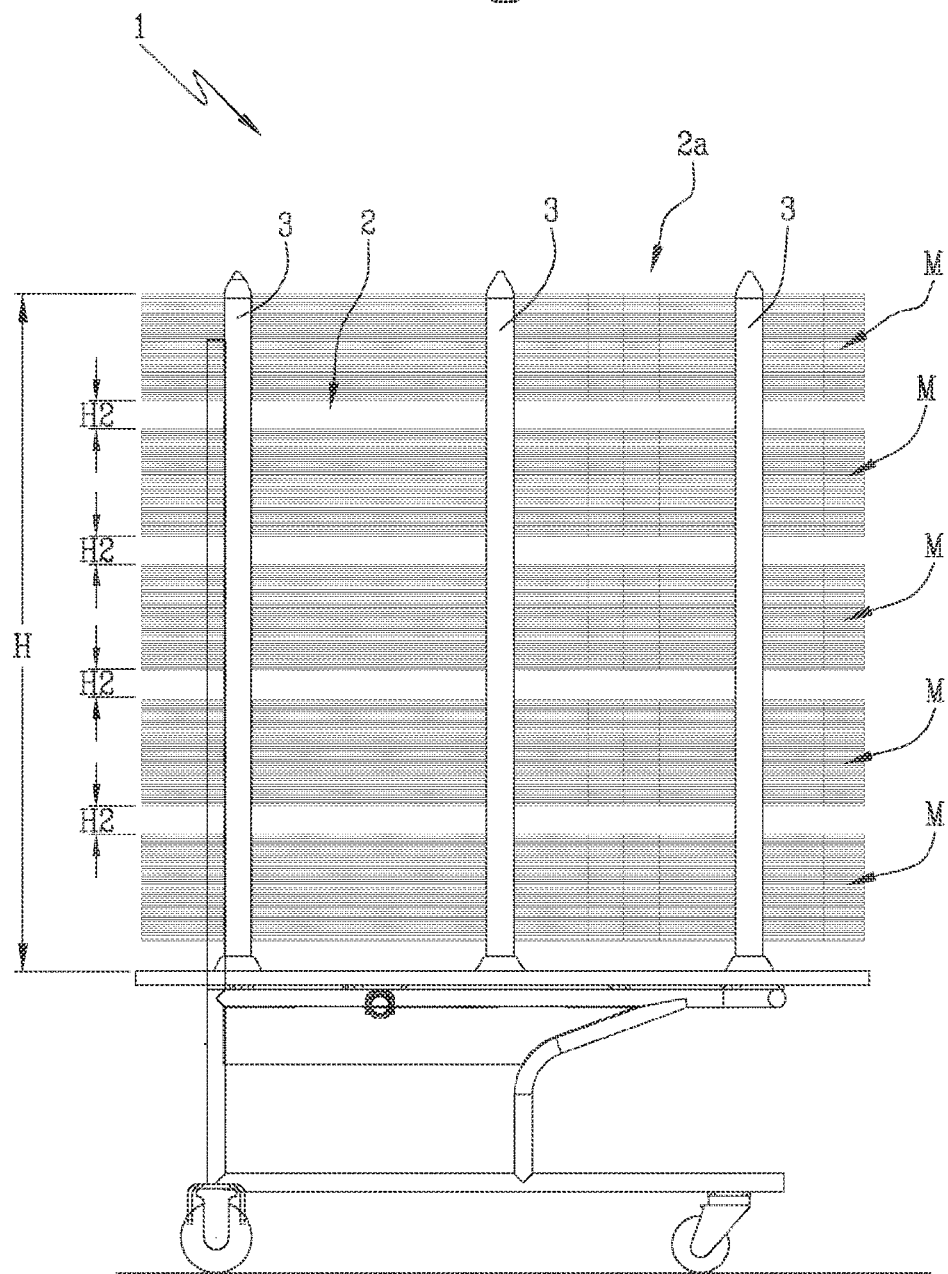
FIG. 2 is a side view of the magazine of this invention.
Figure 3:
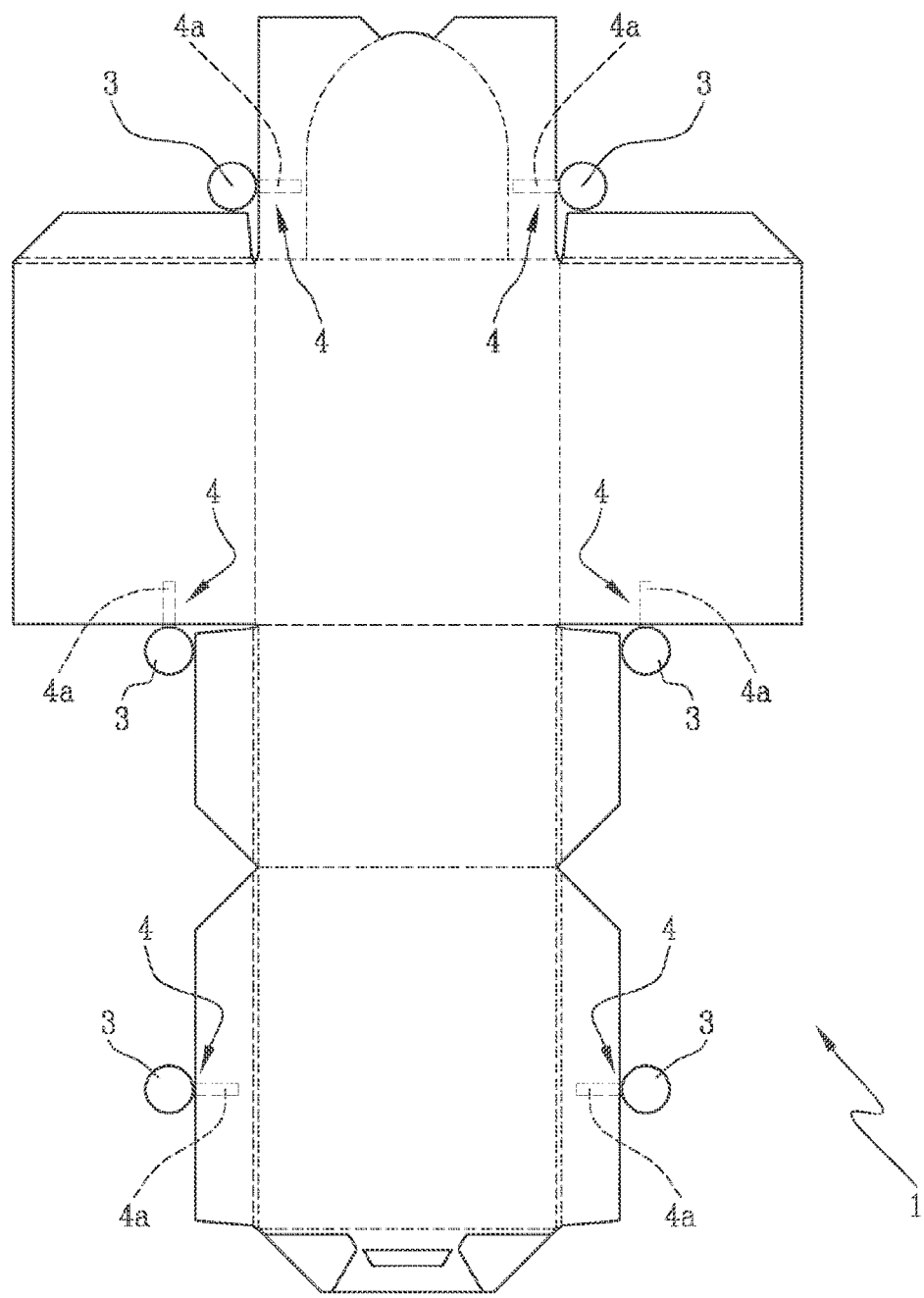
FIG. 3 is a bottom view of the magazine of this invention.

In other words, the channel 2 is made in such a way as to let the packs of blanks M pass through it. Therefore, by channel 2 is meant the passage defined by the magazine 1 itself—that is, by a main body of the magazine 1—which in some ways allows the packs of blanks M to be retained, as will become clearer as this description continues. FIG. 3 shows a magazine 1 provided with six supporting rods 3 that define the main body of the magazine 1 itself. In this embodiment, the channel 2 is defined by the supporting rods 3 being placed in such a way as to substantially follow the perimeter of the blank (that is, of the pack of blanks M) to allow it to be stored. FIGS. 1 and 2 also show a magazine 1 whose main body is defined by the supporting rods 3, although other embodiments are possible (such as, for example, a main body substantially in the shape of a parallelepiped which is internally hollow to define the aforesaid channel 2).

The channel 2 thus defines an inside wall $2b$ which extends for a height H (preferably coinciding with the total height of the magazine 1 itself). Preferably, the height H is between 80 and 140 cm. Still more preferably, the height H is approximately 100 cm.

Advantageously, the vertical configuration allows obtaining a manageably sized magazine 1.

The magazine 1 also comprises a succession of groups of supporting parts 4 distributed along the height H of the inside wall $2b$ of the channel 2. More specifically, the supporting parts 4 are distributed at predetermined distances H1 from each other. Preferably, each distance H1 is between 15 cm and 40 cm. Still more preferably, each distance H1 is approximately 20/25 cm.

That way, each group of supporting parts 4 is located at a respective level of the channel 2 to support a respective pack of blanks M. More specifically, each supporting part 4 is configured to support the bottom of a pack of blanks M, as shown in FIG. 1 and FIG. 3. Further, each supporting part 4 is positioned in such a way as to leave a predetermined gap H2 between every two packs of blanks M inserted in the channel 2 so as to prevent contact between, and possible damage to, the packs of blanks M. Preferably, the gap H2 is between 2 cm and 10 cm. Still more preferably, the gap H2 is approximately 5 cm.

As shown for example in FIG. 2, the gap H2 between the packs of blanks M, in conjunction with the supporting rods 3, allows obtaining portions of the magazine 1 with which an operator can interact with the packs of blanks M, manually or with suitable tools. More specifically, thanks to the gap H2, an operator can remove a respective pack of blanks M from the channel 2 by working from under it without coming into contact with the pack of blanks M underneath it. Moreover, also thanks to the gap H2, an operator inserting a respective pack of blanks M can accompany it into the channel 2 without coming into contact with the pack of blanks M underneath it.

Alternatively, the gap H2 is useful for automated means (such as a robotic arm, for example) which can be inserted under a respective pack of blanks M so as to lift it in order to extract it from the channel 2 or to prevent it from coming into contact with a pack of blanks M underneath it during insertion.

In other words, the distance H1 between the supporting parts 4 allows obtaining a gap H2 between two packs of blanks M placed above one another to prevent damage to the packs of blanks M while they are being extracted from, or inserted into, the channel 2.

Each supporting part 4 is movable between a retracted position and an at least partly extracted position.

By retracted position (FIG. 1A) is meant a position of the supporting part 4 (labeled A) in which it is aligned with the inside wall 2b of the channel 2 to allow the packs of blanks M to move along the channel 2 towards a portion under the supporting part 4.

Alternatively, the expression "retracted position" may be used to mean a position of the supporting part 4 in which it is recessed with respect to the inside wall 2b of the channel 2 to allow the packs of blanks to move along the channel 2 towards a portion under the supporting part 4.

Preferably, the inside wall 2b is provided with suitable grooves 2c, each configured to accommodate a respective supporting part 4. For example, the grooves 2c are shaped to match the inside wall 2b in such a way as to align the supporting part 4, as shown for example in FIG. 1. Alternatively, the grooves 2c are shaped to accommodate the supporting part 4, allowing the supporting part 4 to be recessed in the inside wall 2b.

By at least partly extracted position (FIG. 1B) is meant a position (labeled B), in which the supporting part 4 projects from the inside wall 2b towards the inside of the channel 2 in such a way as to intercept a pack of blanks M moving down the channel 2 and to provide a steady support for the pack of blanks M.

Figure 1A:
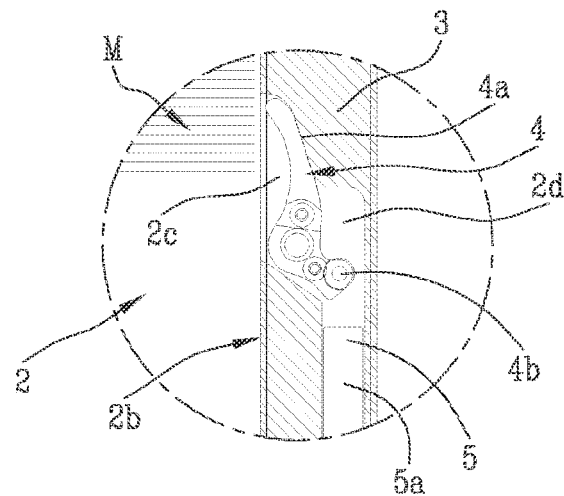
FIGS. 1A-1C are details of different portions of the magazine of FIG. 1.
Figure 1B:
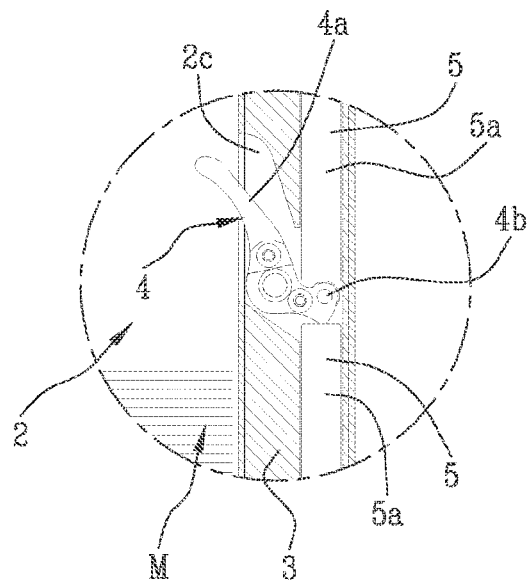
Figure 1C:
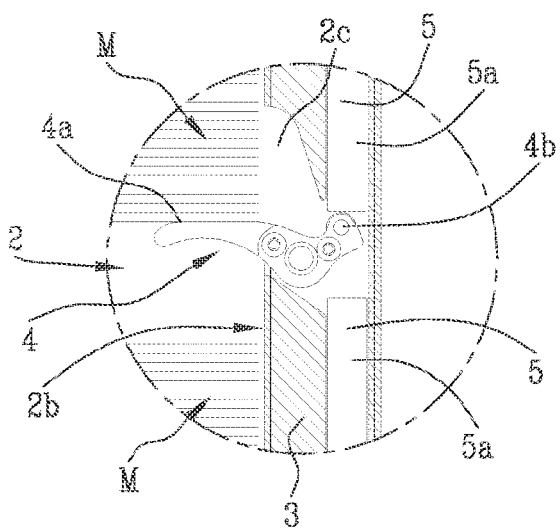

As shown for example in the accompanying drawings, in particular in FIG. 1, the at least partly extracted position is an intermediate position of the supporting part 4, between the retracted position (FIG. 1A) and a fully extracted position (FIG. 1C) of the supporting part 4.

The fully extracted position (FIG. 1C) is a position of the supporting part 4 (labeled C) where the supporting part 4 is, preferably, substantially perpendicular to the inside wall 2b of the channel. The fully extracted position of the supporting part 4 defines the steady support for the respective pack of blanks M.

Each supporting part is movable by a rotational movement from the retracted position to the at least partly extracted position and vice versa. This rotational movement occurs around a horizontal axis (perpendicular to a direction of extension of the channel 2).

The fully extracted position is preferably defined by a further rotation of the supporting part 4 under the weight of a pack of blanks M resting on the supporting part 4.

As it moves down the channel 2, the pack of blanks M comes into contact with the supporting part 4, causing it to rotate from the at least partly extracted position to the fully extracted position. In other words, when it is at the at least partly extracted position, the supporting part 4 is able to intercept a pack of blanks M moving down the channel 2 and, by rotating, to accompany the downward movement of the pack of blanks M, until reaching the fully extracted position where it provides a steady support for the pack of blanks M.

The magazine 1 is also provided with transmission means 5 configured to automatically move each supporting part 4 from the retracted position to the at least partly extracted position when the supporting part 4 immediately below it intercepts a respective pack of blanks "M", thereby defining the steady support. The transmission means 5 are also configured to automatically move each supporting part 4 from the at least partly extracted position to the retracted position when a pack of blanks M is removed from the supporting part 4 immediately below it.

As shown for example in the accompanying drawings, each supporting part 4 may be provided with a supporting portion 4a, preferably flattened, configured to define the steady support for a respective pack of blanks M, and a contact portion 4b, configured to interact with the transmission means 5. The contact portion 4b is configured to interact with the transmission means 5 in such a way as to automatically move the supporting part 4 from the retracted position to the at least partly extracted position. More specifically, when a supporting part 4 below intercepts a pack of blanks M moving down from above it, the contact portion 4b of that supporting part 4 drives a transmission means 5 to interact with the contact portion 4b of the supporting part 4 immediately above, causing the latter to move from the retracted position to the at least partly extracted position.

Preferably, the supporting part 4 has its barycentre at a position such that the rotational movement from the at least partly extracted position to the retracted position can be performed automatically. In other words, when a pack of blanks M is lifted off a supporting part 4, the latter moves automatically to the at least partly extracted position, causing the transmission means 5 to move down and thus to allow the supporting part 4 above to move from the at least partly extracted position to the retracted position.

Preferably, each supporting part 4 is rotatable about a tilting axis located at an intermediate position between the supporting portion 4a and the barycentre of the supporting part so that the rotational movement from the at least partly extracted position to the retracted position can be performed automatically by gravity. In other words, each supporting part 4 is configured to pivot (that is, to tilt) about its tilting axis and, when necessary, is held in position by the action of the transmission means 5.

The transmission means 5 can be embodied in the form of drive rods 5a (as shown in the accompanying drawings, for example) extending between two respective supporting parts 4 placed one above the other. In other words, the transmission means 5 are interposed between two supporting parts 4 which are located on two levels, one above the other.

The drive rods 5a are movable between a raised position and a lowered position.

By raised position is meant a position where the drive rod 5a is lifted by the action of the supporting part 4 below it reaching the fully extracted position. In other words, when the supporting part 4 reaches the fully extracted position, its rotational movement causes its contact portion 4b to push the respective drive rod 5a upwards to interact with the contact portion 4b of the supporting part 4 above it. Thus, when the drive rod 5a is at the raised position, the supporting part 4 above is moved from the retracted position to the partly extracted position.

By lowered position is meant a position where the drive rod 5a moves down by gravity after the supporting part 4 below reaches the retracted position.

Preferably, the drive rod 5a is provided with limit stop portions 5b configured to prevent unwanted movements of the drive rod 5a itself which might lead to unwanted blocking of the supporting parts 4. In other words, the limit stop portions 5b are configured to delimit the raised position and the lowered position of the drive rod 5a.

Each drive rod 5a is engaged or engageable in supporting relation with the supporting parts 4 above and below at respective portions of the supporting parts 4 opposite to the supporting portion 4a with respect to the tilting axis. Preferably, the portion is the contact portion 4b.

Preferably, the transmission means 5 are housed in the inside wall 2b of the channel 2. More specifically, the inside wall 2b is provided with slidable housing means whereby each drive rod 5a is accommodated in a respective vertical slide channel 2d.

Preferably, as for example in the embodiments illustrated in the accompanying drawings, each supporting rod 3 defines a portion of the inside wall 2b of the channel 2 and is provided with respective supporting parts 4 and slide channels 2d for the drive rods 5a.

In the accompanying drawings, each supporting rod 3 is provided with five supporting parts 4 defining five levels along the channel 2. In other words, the embodiment of the magazine 1 shown in the accompanying drawings can be used to store five packs of blanks M. Depending on the extension of the channel 2, the number of supporting parts 4 and on the distance H1 at which they are spaced from each other (hence depending on the size of the packs of blanks M), magazines with different storage capacities can be obtained.

Preferably, the magazine 1 of this invention may be provided with wheels to make it movable and/or self-propelled so that, if necessary it can be placed more conveniently within a storage facility or other building. Alternatively, the magazine 1 may be transported with a forklift truck or other handling means.

Advantageously, the magazine 1 of this invention is capable of overcoming the above mentioned disadvantages of the prior art.

The magazine 1 offers the possibility of creating different storage levels for different packs of blanks M, even packs of different sizes.

Advantageously, the magazine 1 is manageably sized and easy to use for an operator or to include in an automated handling system.

Advantageously, the magazine 1 allows avoiding damage to the different packs of blanks M when they are inserted and when they are extracted.

The invention claimed is:

1. A method for making containers from blanks, comprising the following steps:
   wherein the containers are configured for containing loose articles;
      preparing a succession of blanks, which are flat;
         folding the blanks about fold lines on each blank to make a succession of three-dimensional containers;
   wherein the step of preparing the succession of blanks is accomplished by a step of withdrawing a pack of blanks from a magazine including a vertical channel and configured to support a plurality of packs,
   wherein the packs of blanks are accommodated in the magazine, above one another and spaced apart by a succession of groups of supporting parts distributed, along a height of an inside wall of the channel, at predetermined distances from each other, such that each group of supporting parts is located at a respective level of the channel to support the bottom of a respective pack of blanks,
   each supporting part being movable between a retracted position, in which the supporting part is aligned or recessed with respect to the inside wall of the channel to allow the packs of blanks to move along the channel towards a portion under the supporting part, and an at least partly extracted position, in which the supporting part projects from the inside wall towards the inside of the channel in such a way as to intercept a pack of blanks moving down the channel and to provide a steady support for the pack of blanks, and wherein the step of withdrawing the pack of blanks from the magazine is accomplished by a step of vertically extracting the pack of blanks from the channel, through an upper opening at a top of the channel;
   providing a transmission mechanism that automatically moves each supporting part from the retracted position to the at least partly extracted position when the supporting part immediately below the each supporting part intercepts the respective pack of blanks, wherein the transmission mechanism includes a drive rod that extends between two respective superposed supporting parts and which is movable between a raised position, in which the drive rod is lifted after the supporting part below reaches the fully extracted position, and a lowered position, in which the drive rod moves down by gravity after the supporting part below reaches the retracted position, and wherein the supporting part above, when the drive rod is at the raised position, is moved from the retracted position to the partly extracted position;
   wherein each supporting part is rotatable about a tilting axis located at an intermediate position between the supporting portion and the barycentre of the supporting part, wherein the rotational movement from the at least partly extracted position to the retracted position can be performed automatically by gravity;
   wherein the drive rod is engaged in supporting relation with the supporting parts above and below at respective portions of the supporting parts opposite to the supporting portion with respect to the tilting axis;
   wherein the transmission mechanism is housed in the inside wall of the channel, by slidably housing each drive rod in a respective vertical slide channel.

2. The method according to claim 1, wherein each of the blanks has a complex shape, having at least a main direction of extension and at least one protrusion extending along a direction perpendicular to the main direction of extension.

3. The method according to claim 1, wherein the step of vertically extracting the pack of blanks from the magazine is accomplished by a step of lifting the pack from the respective group of supporting parts and is followed by a step of automatically moving the supporting parts immediately above the respective group of supporting parts from the at least partly extracted position to the retracted position.

4. The method according to claim 1, and further comprising a step of placing at least one of the packs of blanks in the magazine, and wherein the step of placing is accomplished by a step of resting the at least one of the packs of blanks on the supporting parts of a respective group of supporting parts and is followed by a step of automatically moving each supporting part of the group of supporting parts immediately above the respective group of supporting parts from the retracted position to the at least partly extracted position.

* * * * *